W. H. STONE.
AUTOMATIC AIR HOSE COUPLING.
APPLICATION FILED JULY 26, 1918.
1,311,023.
Patented July 22, 1919.
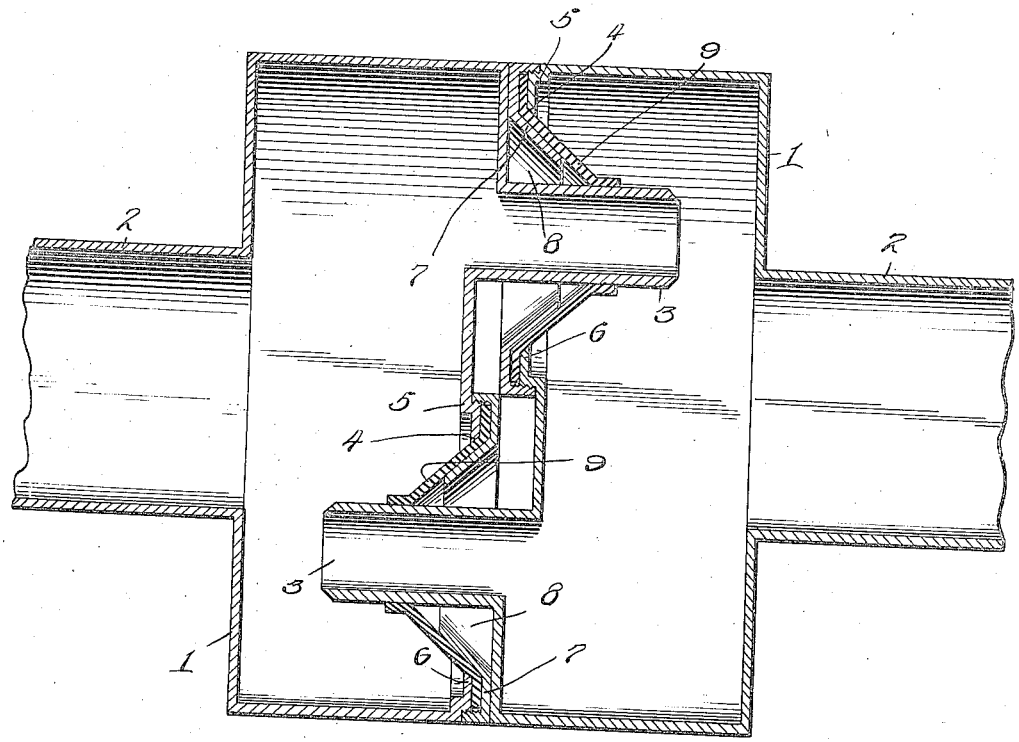
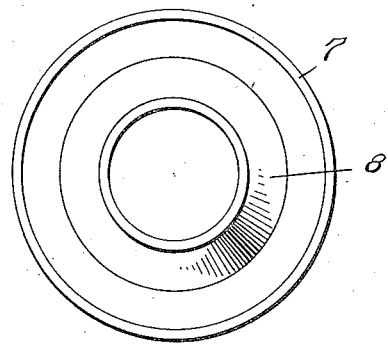

UNITED STATES PATENT OFFICE.

WALLACE H. STONE, OF WABASHA, MINNESOTA.

AUTOMATIC AIR-HOSE COUPLING.

1,311,023.

Specification of Letters Patent. Patented July 22, 1919.

Application filed July 26, 1918. Serial No. 246,893.

*To all whom it may concern:*

Be it known that I, WALLACE H. STONE, a citizen of the United States, residing at Wabasha, in the county of Wabasha and State of Minnesota, have invented new and useful Improvements in Automatic Air-Hose Couplings, of which the following is a specification.

This invention relates to automatic air hose couplings and it consists in the novel features hereinafter described and claimed.

An object of the invention is to provide a coupling of the character stated which is of simple and durable structure and having its parts and features so arranged that the said parts and features of two coupling members may automatically engage each other when brought together whereby air may freely pass from one coupling member to the other and vice versa.

With this object in view the coupling includes a member having a hollow head portion with an air pipe attached to one side thereof. A nipple is mounted at the opposite side of the head and is offset with relation to the pipe. The head is provided at the same side at which the nipple is located with an opening which is surrounded by a shoulder having an inturned annular flange. A ring is screwthreaded upon the shoulder and surrounds the flange and is adapted to clamp a rubber sleeve in position against the flange of the shoulder. The ring is provided with a centrally located conical portion which engages the sleeve and holds the same in the form of a cone. The ring of one coupling is adapted to receive the nipple of the other coupling member, consequently the nipples when the members are in engagement with each other constitute passageways for the air from one coupling member to the other and the sleeves fit snugly about the outer surfaces of the nipples whereby the air is prevented from escaping.

In the accompanying drawing:—

Figure 1 is a longitudinal sectional view of the coupling, showing the members connected together.

Fig. 2 is an elevation of one of the conical clamping rings.

Inasmuch as the coupling members are alike a description of one will suffice. Each coupling member comprises a hollow head 1 having a pipe 2 attached to one side thereof. The pipe 2 may be connected with an air hose in any suitable manner. A nipple 3 is located at the opposite side of the head 1 from the pipe 2. The head 1 is provided at the same side as that at which the nipple is located with an opening 4 which is surrounded by an annular boss 5. The boss 5 is provided at its outer end with an inturned annular flange 6. A ring 7 is adapted to be screwed upon the shoulder 5 and the said ring is provided with a centrally located conical portion 8. A sleeve 9 is secured between the peripheral portion of the ring 7 and the flange 6 and the conical portion 8 bears against the inner surface of the sleeve 9 and holds the intermediate portion of the said sleeve approximately in shape of a cone.

When the coupling members approach each other the nipple 3 of one member is received within the sleeve 9 of the other member; consequently the said nipples serve as passageways for the air between the heads of the two coupling members. Inasmuch as the air which is received in the said head is under pressure the sleeves 9 will be forced in close contact with the sides of the nipples 3; therefore the air is prevented from leaking between the inner edges of the sleeve and the sides of the nipples.

When the members are moved away from each other the nipples 3 are slid out of engagement with the sleeves 9. The conical portions 8 of the ring 7 serve as guides for directing the nipples in position in the sleeve and also serves as means for holding the sleeves in proper shape.

Having described the invention what is claimed is:—

A coupling comprising a hollow head, a pipe attached to one side of the head, a nipple attached to the opposite side of the head and being offset with relation to the pipe, the head being provided at the same side as that at which the nipple is located with an opening, a shoulder surrounding said opening and having an inturned annular flange, a ring having screwthread engagement with the shoulder and provided with a central conical portion extending within said opening, a flexible sleeve clamped between the ring and the flange and an inwardly extending conical portion bearing against the conical portion of the sleeve and located interiorly of the head.

In testimony whereof I affix my signature.

WALLACE H. STONE.